May 12, 1970 J. ADAMSON 3,511,628
METHOD AND APPARATUS FOR BENDING GLASS IN SHEET FORM
Filed Nov. 29, 1966 3 Sheets-Sheet 1
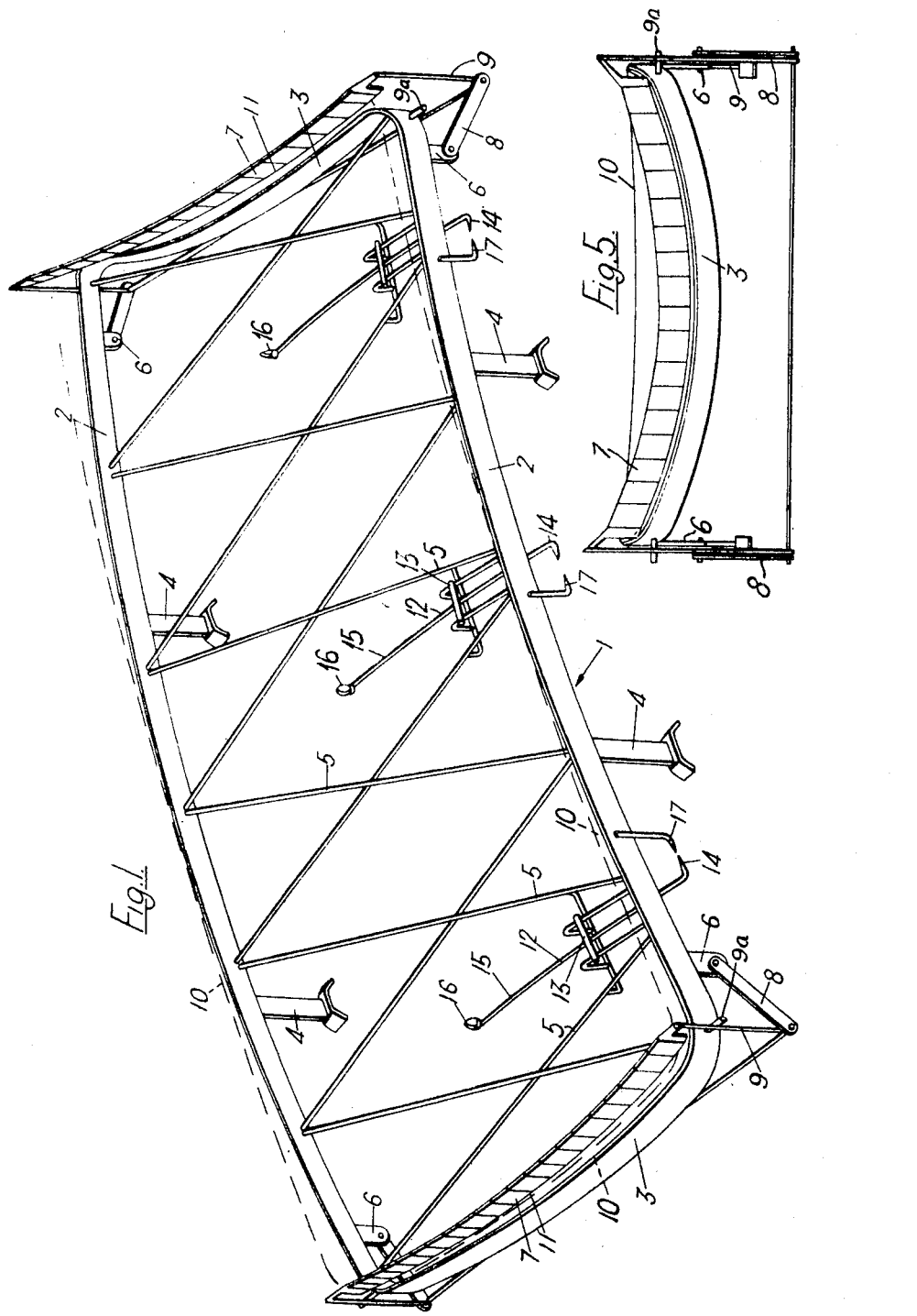
INVENTOR
JOHN ADAMSON

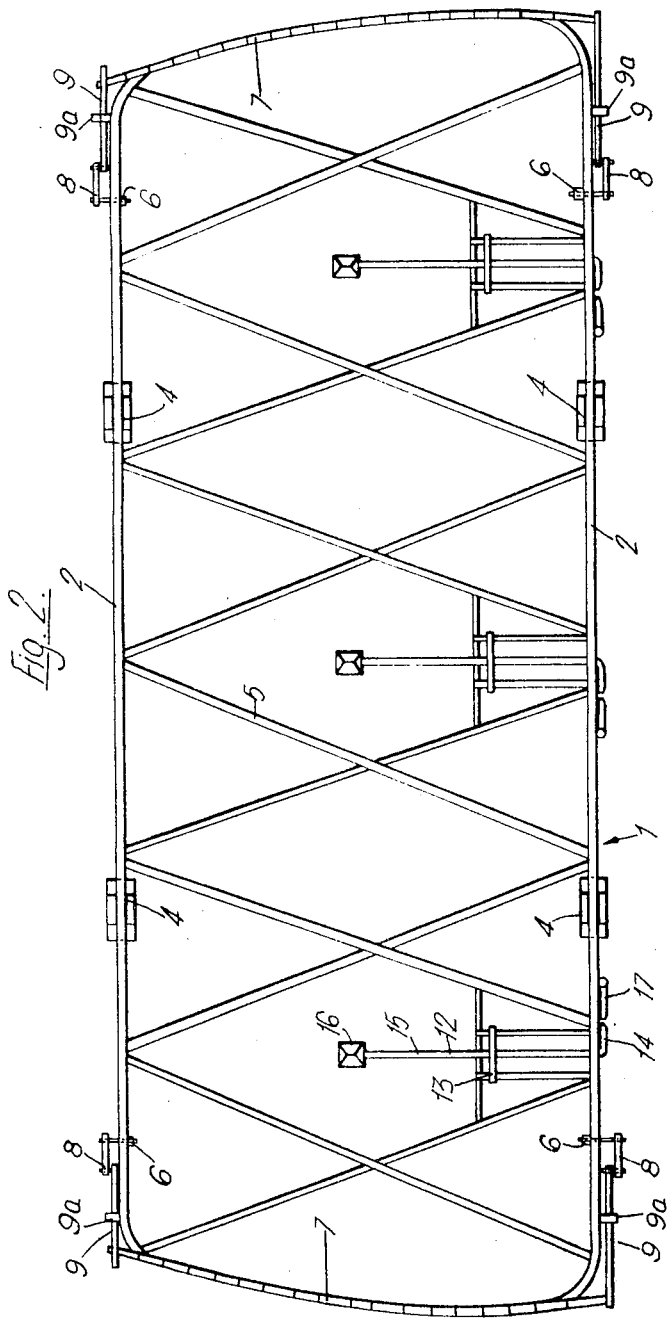

May 12, 1970    J. ADAMSON    3,511,628
METHOD AND APPARATUS FOR BENDING GLASS IN SHEET FORM
Filed Nov. 29, 1966    3 Sheets-Sheet 3
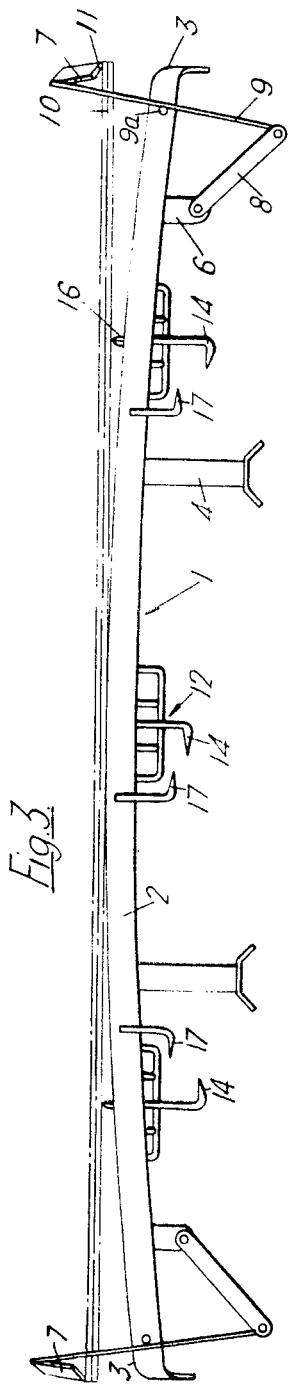
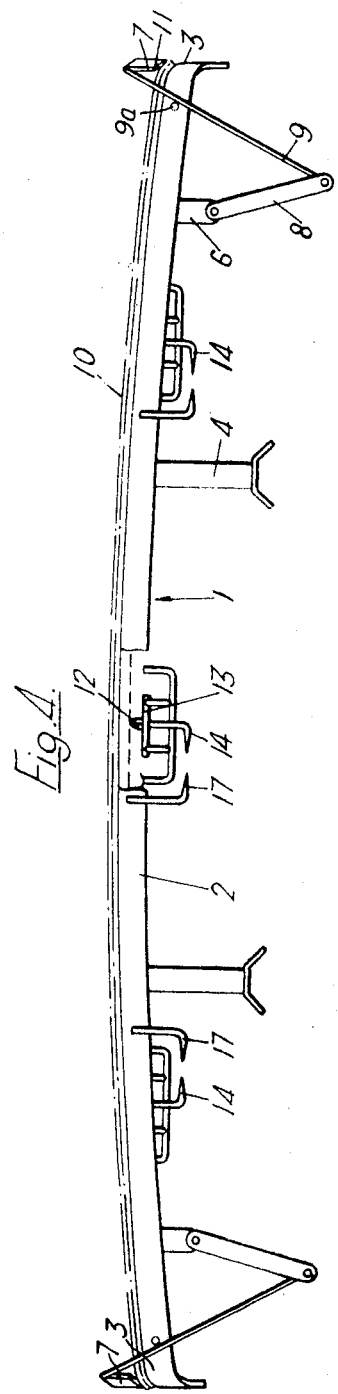
INVENTOR
JOHN ADAMSON United States Patent Office 3,511,628
Patented May 12, 1970

3,511,628
METHOD AND APPARATUS FOR BENDING GLASS IN SHEET FORM
John Adamson, Bromsgrove, England, assignor to Triplex Safety Glass Company Limited, London, England, a corporation of Great Britain
Filed Nov. 29, 1966, Ser. No. 597,629
Claims priority, application Great Britain, Dec. 2, 1965, 51,239/65
Int. Cl. C03b 23/02
U.S. Cl. 65—107                                                      7 Claims

ABSTRACT OF THE DISCLOSURE

A method of imposing upon glass in sheet form two curvatures in opposing directions about axes of the glass sheet perpendicular to each other, employs a generally rectangular horizontally disposed bending frame of which the longitudinal side members have a convex profile in respective upright imaginary surfaces which may be planes and the transverse end members have a concave profile in respective upright imaginary surfaces planes which may be planes. The sheet is secured on the frame and then heated until it sags under gravity onto the side members, the gravital force from the middle outwardly across the extremities of the sheet being progressively employed to gradually force the full width of the sheet ends onto the end members. Conforming members pivotally mounted near opposite ends of the bending frame are employed to apply the gradually progressive force to the sheet ends.

---

This invention relates to a method and apparatus for bending glass in sheet form and more particularly to methods and apparatus for bending glass in sheet form so that the glass sheet exhibits opposed curvature in two directions at right angles to each other.

It is known that glass in sheet form may be bent to a desired curvature by being placed in contact with a bending mould or frame having the curvature which it is desired for the glass sheet to adopt, and then heating the glass sheet so that the glass sags under the influence of gravity to adopt the curvature of the bending mould or frame. In the case where a peripheral bending frame is employed, it is found that there will be some sagging of the central parts of the glass sheet which are unsupported by the peripheral bending frame, and it is, therefore, evident that a glass sheet having curvatures in opposite directions about axes which are at right angles, may be obtained by employing a peripheral bending frame, the main outline of which is convex but which will permit sagging of the glass sheet so that there is a concave curvature about the opposite axis of the glass sheet.

However, it is found that there is some variation in the concave curvature imparted to similar glass sheets by this method using identical apparatus, and it is a main object of the present invention to provide a method and apparatus for obtaining glass sheets with consistently reproducible opposed curvatures in two directions at right angles to one another.

According to the present invention, there is provided a method of imposing upon glass in sheet form two curvatures in opposing directions about axes of the glass sheet perpendicular to each other, comprising utilising a generally rectangular horizontally disposed peripheral bending frame, the longitudinal side members of which frame have a convex profile in upright imaginary surfaces which may be parallel vertical planes, tnd transverse end members which have a concave profile in upright imaginary surfaces which may be vertical planes disposed angularly to the first said imaginary surfaces, the profiles merging at the corners of the frame, securing the sheet in balanced condition in the middle areas of the longitudinal side members of the frame by the application of a gravital or added force on the extremities of the sheet, heating the glass sheet on the frame to a temperature at which the glass will sag under its own weight on to the convex profile of the longitudinal side members and progressively employing the added force from the middle, outwardly in each direction across the extremities of the sheet to gradually force the full width of the sheet ends on to the concave profile of the transverse end members, whereby the heated sheet adopts a longitudinal concave curvature between the ends of the frame as well as the convex curvature derived from the longitudinal side members of the frame.

In general it is found that the best results are obtained when differential heating is applied to the glass sheet so that those parts of the glass sheet which are desired to have a curvature of the smallest radius are heated to the highest temperature.

Accordingly, the present invention comprises the step of providing indications of the degree of concave curvature occurring as bending proceeds at parts of the glass sheet intermediate the ends thereof.

The method of the present invention has particular application in the simultaneous bending of two glass sheets which are to form the components of a laminated windscreen or backlight and from this aspect a method of bending sheets according to the invention is characterised by the fact that a second sheet of approximately the same size is superimposed on the first mentioned sheet, itself placed on the horizontally disposed peripheral bending frame, the second sheet being slightly larger than the first sheet to compensate for the slight differences in curvature. The bent sheets may then be bonded by an interleaving bonding layer of known type to form a laminated windscreen or backlight.

The present invention further comprehends apparatus for bending glass in sheet form to produce a glass sheet having a longitudinal convex curvature and a transverse concave curvature, comprising horizontally disposed peripheral bending frames having longitudinal side members which define a convex curvature intended to give the desired longitudinal curvature to the glass sheet, and transverse end members which define a concave curvature intended to be imposed on the ends of the glass sheet the said curvatures merging at the corners of the frame, respective conforming members pivotally mounted near opposite ends of the peripheral bending frame, each conforming member having a convex lower edge surface exhibiting a curvature complemental to the concave curvature of the transverse end members of the bending frame, and each said conforming member being mounted to be positioned with the said lower edge surface in contact with the respective extremity of the upper surface of a glass sheet to be bent on the frame at a position over the transverse end members, whereby the ends of the cold glass sheet are secured on the bending frame and then when the glass is sufficiently heated it adopts exactly the desired longitudinal concave curvature extending from end to end of the sheet.

A series of rocking members are preferably fulcrumed on the frame to rock in vertical planes, each rocking member comprising a testing arm and an indicator arm, the fulcrum of each rocking arm being disposed so that the testing arm always engages the underface of a sheet of glass located on the bending frame, each testing arm being adapted to be depressed as bending proceeds, and each indicator arm moved with respect to an individual indicator carried by the frame, so that, as the testing arms are depressed as bending proceeds, the indicator's arm is raised towards the fixed indicator to illustrate the degree of bending achieved at any particular time during the bending operation.

The present invention also comprehends a glass sheet having opposite curvatures in two directions at right angles whenever manufactured by a method in accordance with this invention.

The invention still further comprehends a pair of bonded glass sheets having matching convex curvatures in a longitudinal direction and concave curvatures in a transverse direction, prepared by a method in accordance with this invention.

In order that the present invention may be more clearly understood, reference will now be made to the accompanying diagrammatic drawings, which show by way of example one preferred embodiment of the invention.

In the drawings:

FIG. 1 is a perspective view of the apparatus for performing the method of the invention, FIG. 2 is a plan view of the apparatus according to FIG. 1, FIG. 3 is a side elevation of the apparatus of FIG. 1 showing two glass sheets positioned thereon preparatory to a bending operation, FIG. 4 is a similar view to FIG. 3 of two glass sheets after the bending operation has been completed, and FIG. 5 is an end view of the apparatus carrying two bent glass sheets as illustrated in FIG. 4.

In the drawings, the same parts are designated by like reference numerals.

Referring now to the drawings, there is shown designated generally by the reference numeral 1 a horizontally disposed peripheral bending frame having longitudinal side members 2 which may be parallel and each define a convex profile in an imaginary surface which may be a vertical plane, and a pair of transverse end members 3 joining the ends of said longitudinal side members, each of the transverse end members 3 defining a concave profile in an imaginary surface which may be a vertical plane.

The horizontal peripheral bending frame 1 is mounted on a support comprising individual legs 4 and support stays 5 which stays cause the peripheral bending frame to maintain its definite shape during the heat treatment involved in bending the glass to the desired curvature.

Near the ends of the respective longitudinal side members 2 there are depending lugs 6 upon which there are pivoted respective conforming members 7 which are strip-like members each disposed in an upright position and having essentially a lower edge surface which exhibits a curvature complemental to the concave profile of the transverse end members 3 of the horizontal peripheral bending frame 1. In FIG. 2 the conforming members 7 are shown as precisely following the outline of the transverse end members 3 of the bending frame; and each member 7 has a convex lower edge which has a curvature complemental to the profile of the respective transverse end member 3 of the bending frame.

The pivotal mounting of the conforming member 7 is effected by a linkage consisting of members 8 and 9 so that the conforming members 7 may be withdrawn outwardly beyond the respective transverse end members 3 of the peripheral bending frame and allowed to fall freely away.

When the conforming members 7 are so withdrawn a plane glass sheet is placed lengthwise on the horizontal peripheral bending frame 1 with a central part of the plane glass sheet, indicated generally by the broken line 10 in FIGS. 1 and 3, supported in balanced condition by the central parts of the longitudinal side members 2.

The conforming members 7 are then swung back over the respective ends of the glass sheet 10 against the stops 9a so that their lower edge surfaces 11 rest upon the extremities of the plane glass sheet 10 and directly above the respective transverse end members 3 (see FIG. 3) ready to apply a conforming force when the glass sheet is in the act of bending. In the meantime, however, the conforming members 7 secure the cold glass in the desired position on the frame while the glass is balanced on the central parts of the respective longitudinal side members 2.

Referring now to FIG. 3, the position of a glass sheet at this stage is clearly indicated except that in FIG. 3 there are two plane glass sheets, one immediately on top of the other, placed on the horizontal peripheral bending frame 1. In order to compensate for the slight difference in the amount of bend which will be imparted to each sheet of glass, one sheet, usually the upper sheet, will have been cut to a slightly larger size.

The bending frame 1 carrying the glass sheet 10 is then advanced through three preheat zones of a bending furnace maintained respectively at temperatures of 320° C., 410° C. and 605° C. The size of each preheat zone and the rate at which the bending frame is advanced therethrough are such that the glass is in each preheat zone for a time of the order of six minutes.

From the third preheat zone the bending frame and the glass are advanced into the bending zone in which the glass sheet is heated generally to a temperature of the order of 630° C. After a period of 2–3 minutes in the bending zone special local heaters are used for heating to slightly higher temperatures those parts, notably the ends and the centre of the glass sheet, where the greatest degrees of curvature are to be imparted to the glass sheet.

When the glass is at a temperature of the order of 630° C. it sags so that the full length of the edge of the side portions of the glass sheet and the end edges of the glass sheet come into contact respectively with the longitudinal side members 2 and the transverse end members 3 of the peripheral bending frame. Because there is no support for the glass sheet between the longitudinal side members 2, there is naturally formed in the sheet a concave curvature transversely of the glass sheet while the convex shaping of the longitudinal side members 2 enforces a convex curvature longitudinally of the glass sheet.

As the heated end portions of the glass sheet 10 sag into at least partial contact with the transverse end members 3, the gravital forces in the conforming members ensure that a full contact between the end edges of the glass sheet 10 and the transverse end members 3 eventually takes place. The conforming members 7 thus apply a conforming force from above the heated glass sheet near the ends thereof.

The actual time for which the glass sheet is maintained in the bending zone is controlled by an operator in accordance with indications given by rocking members 12 fulcrumed at 13 on a structure mounted on the supporting stays 5.

Each pivoted member 12 comprises an indicator arm 14 and a testing arm 15, so balanced that the testing arm 15 is always urged upwards so that a point 16, positioned at the end of the testing arm 15, is in contact with the under surface of the glass sheet, or the lower glass sheet if two are being bent simultaneously, at all times.

The way in which the position of the indicator arm 14 varies in relation to a fixed indicator 17 between the beginning of the process, when the glass sheet is still planar, and the completion of the process, when the glass sheet is bent to conform to the curvatures of the bending frame 1, is indicated respectively in FIG. 3 and FIG. 4 of the accompanying drawings. In order to avoid introducing "over-sag" of the glass sheet during the bending operation, the operator watches the indicators 14 and, as they approach a position level with the fixed indicators 17, as shown in FIG. 4, he operates the apparatus to remove the bending frame from the bending zone and transfer it through annealing zones and natural cooling zones to final cold air forced cooling zones, after which the bent glass sheet is removed from the peripheral bending frame 1.

As the glass sheet is advanced on the peripheral bending frame through the various stages of the bending process it is effectively clamped in position on the peripheral bending frame 1 by the conforming members 7. The main use and advantages of the conforming member 7, however, is to form the end curvatures of the bent glass sheet in a controlled manner.

By the use of the apparatus and method in accordance with the present invention chipping of the edges of the glass, such as may arise from the use of stops to locate the glass in position on the bending mould, is substantially avoided.

Advantageously, the conforming members 7 have had their lower edge surface 11 formed with glass fibre cloth impregnated with graphite, or, alternatively, the conforming members 7 may be wrapped in glass fibre cloth impregnated with graphite. The glass fibre cloth is used to ensure that the glass does not crack, after leaving the bending furnace, because of different rates of cooling of the metal conforming members 7 and the glass itself.

I claim:

1. A method of imposing upon glass in sheet form two curvatures in opposing directions about axes of the glass sheet, perpendicular to each other, comprising mounting a glass sheet in a generally horizontal position upon horizontally oriented peripheral supporting surfaces on a generally rectangular open peripheral bending frame, the spaced supported surfaces of the longitudinal side members of which frame have a convex profile in respective upright imaginary surfaces and the spaced supporting surfaces of the transverse end members of which frame have a concave profile in respective upright imaginary surfaces disposed angularly to the first said imaginary surfaces, the profiles of said supporting surfaces merging at the corners of the frame, securing the sheet in balanced condition in the middle areas of the longitudinal side supporting surfaces of the frame by the application of an added force on the end portions of the sheet, heating the glass sheet on the frame to a temperature at which the glass will sag under its own weight onto and between the convex profile of the longitudinal side supporting surfaces and progressively employing the added force to the end portions of the sheet to gradually force the full width of the sheet end portions onto the concave profile of the transverse end supporting surfaces. whereby the heated sheet adopts longitudinally thereof a transverse concave curvature between the sides of the frame as well as the convex curvature longitudinally of the sheet derived from the side supporting surfaces of the frame.

2. A method according to claim 1 including the step of applying differential heating to the glass sheet so that those parts of the glass sheet which are desired to have a curvature of the smallest radius are heated to the highest temperature.

3. A method according to claim 1, including the step of providing indications of the degree of concave curvature occurring as bending proceeds at parts of the glass intermediate the ends thereof.

4. Apparatus for bending glass in sheet form to produce a glass sheet having a longitudinal convex curvature and a transverse concave curvature, comprising an open bending frame having horizontally oriented supporting surfaces and comprising spaced longitudinal side members which define a convex curvature intended to give the desired longitudinal curvature to the glass sheet, and transverse end members which define a concave curvature intended to be imposed on the ends of the glass sheet, the said curvatures merging at the corners of the frame, respective conforming members pivotally mounted near opposite ends of the peripheral bending frame, each conforming member being disposed generally horizontally above the respective end member and having a convex lower edge surface exhibiting a curvature complemental to the concave curvature of the transverse end members of the bending frame, and each said conforming member being mounted to be positioned with the said lower convex edge surface in contact with the respective extremity of the upper surface of a glass sheet to be bent on the frame at a position over the transverse end members, whereby the ends of the cold glass sheet are secured on the bending frame and then when the glass is sufficiently heated it adopts exactly the desired transverse concave curvature extending from end to end of the sheet.

5. Apparatus according to claim 4, comprising a series of rocking members fulcrumed on the frame to rock in vertical planes, each rocking member comprising a testing arm and an indicator arm, the fulcrum of each rocking arm being disposed so that the testing arm always engages the underface of a sheet of glass located on the bending frame, each testing arm being depressed as bending proceeds, and each indicator arm moved with respect to an individual indicator carried by the frame, so that, as the testing arms are depressed as bending proceeds, the indicator arms are raised towards the fixed indicators to illustrate the degree of bending achieved at any particular time during the bending operation.

6. A method of imposing upon glass in sheet form two curvatures in opposite directions about axes of the glass sheet perpendicular to each other, according to claim 1, wherein a second sheet of approximately the same size is superimposed on the first-mentioned sheet, itself placed upon the horizontally disposed peripheral bending frame, the second sheet being slightly larger than the first sheet to compensate for the slight differences in curvature.

7. A method of simultaneously bending two sheets of glass according to claim 6, including the step or interleaving a bonding layer to form a laminated assembly.

References Cited

UNITED STATES PATENTS

| 2,893,170 | 7/1959 | Carson et al. | 65—287 X |
|-----------|--------|---------------|----------|
| 3,136,619 | 6/1964 | McRoberts et al. | 65—273 X |
| 3,153,582 | 10/1964 | Richardson | 65—158 |
| 3,224,856 | 12/1965 | McMaster | 65—287 X |
| 3,294,516 | 12/1966 | Carson et al. | 65—287 X |
| 3,340,037 | 9/1967 | Stevenson | 65—287 |

ARTHUR D. KELLOGG, Primary Examiner

U.S. Cl. X.R.

65—158, 273, 275, 287